(No Model.) 2 Sheets—Sheet 1.
J. EDMONDS.
DRAINING MACHINE.
No. 599,442. Patented Feb. 22, 1898.
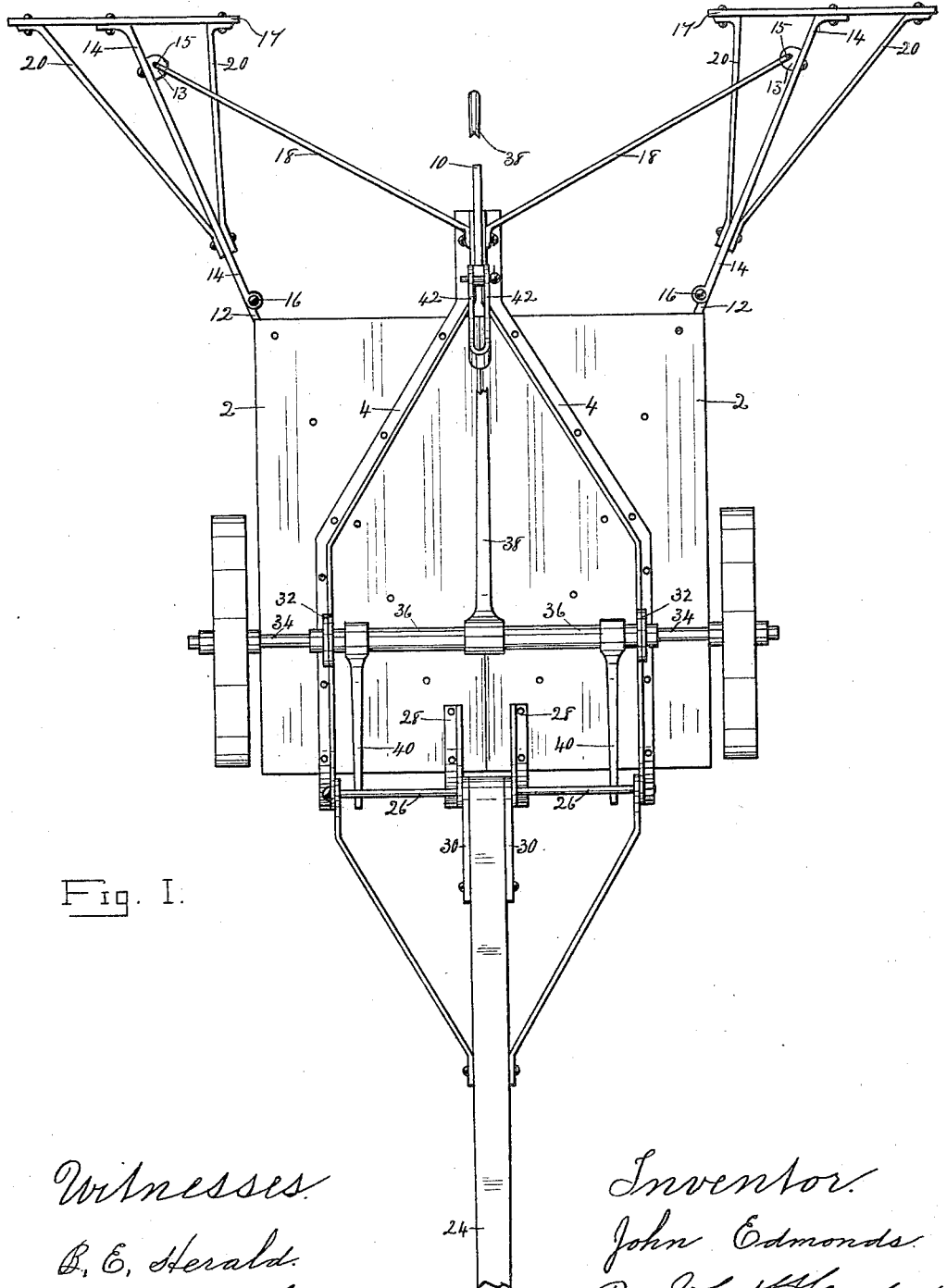
Fig. I.
Witnesses.
B. E. Herald
N. McPherson
Inventor.
John Edmonds.
By John H. Hendry
Attorney.

(No Model.) 2 Sheets—Sheet 2.
J. EDMONDS.
DRAINING MACHINE.
No. 599,442. Patented Feb. 22, 1898.
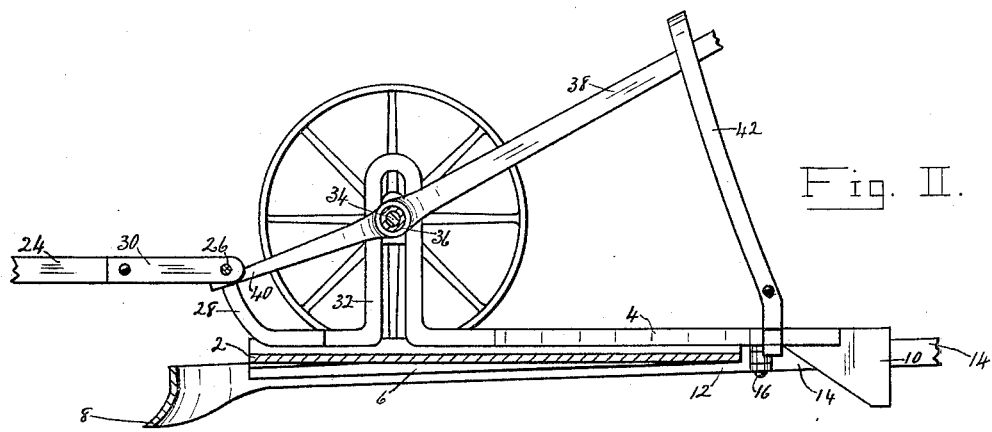
Fig. II.
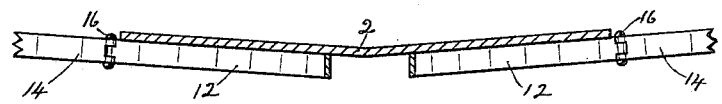
Fig. III.
Fig. IV.
Fig. V.
Witnesses.
B. E. Herald.
N. McPherson
Inventor.
John Edmonds
By John H. Hendy
Attorney.
THE NORRIS PETERS CO., PHOTO-LITHO., WASHINGTON, D. C.

UNITED STATES PATENT OFFICE.

JOHN EDMONDS, OF WOODBURN, CANADA.

DRAINING-MACHINE.

SPECIFICATION forming part of Letters Patent No. 599,442, dated February 22, 1898.

Application filed November 8, 1897. Serial No. 657,863. (No model.)

*To all whom it may concern:*

Be it known that I, JOHN EDMONDS, a citizen of Canada, residing at Woodburn, in the county of Wentworth and Province of Ontario, Canada, have invented new and useful Improvements in Draining-Machines, of which the following is a specification.

My invention relates to an agricultural machine or implement which is capable of draining, shaping, and leveling the land in such a manner as to produce the best possible results in the quality and quantity of production. Said machine consists of a land-plate formed with gradual and slightly-raised sides, certain rearward-spreading blades underneath said plate and extending by detachable hinged connection beyond and capable of receiving transverse sweep-plates, plowshares in front of plate, and guide in rear thereof, and means for raising the machine on its ground-wheels, which revolve on or with their transverse shaft.

The objects of my invention are, first, to provide a machine which shall be capable of cutting a neat and well-defined water-furrow; second, to shape the land in order to give the best possible and perfect drainage; third, to provide means for leveling elevations and filling in depressions, therefore distributing and leveling the ground; fourth, to afford facilities for the proper adjustment of the machine in relation to a proper distance from the ground and on its ground-wheels when inoperative—for instance, when turning corners, turning around, passing through ordinary gateways—and to facilitate the portability of the machine when on the road.

Figure 1 is a plan of my improved land-shaping machine. Fig. 2 is a sectional side elevation of the same, the rear hinged blades being broken. Fig. 3 is a front sectional elevation of the depressed land-plate, showing the under blades. Fig. 4 is a front elevation of the detached rear sweeps, and Fig. 5 shows a front view of the contour or surface of the land having middle furrow when shaped on a reduced scale.

This specification discloses very clearly and minutely the scope of my invention and its general constructive features embodied therein.

The land-plate, as indicated by 2, together with its upper secured angle-iron ribs 4 and its under secured angle-iron ribs 6, is the base of the general construction. This plate 2 is provided with front plowshare 8 and rear guide or rudder 10, which is secured to the rear end of the overhanging angle-ribs 4, and the said plow-shaped share 8 forms a part of or is secured to the fore part of the important under blades 12, which are secured to the under angle-ribs 6. These blades come in close proximity in front and beyond to form a part of the plowshare which extends downward below the said blades. It will be noticed that these blades spread out considerably as they gain rearward and at their terminus are joined by the rear spreading-out blades 14, which are hinged at 16 thereto principally for portable and also for detachable purposes, and especially to allow the machine to pass through gateways. This is accomplished by simply unhooking the braces 18. The rear ends of the machine may then be brought inward on their hinges 16. The rear ends of these blades are provided with rear sweeps 17, the lower edges of which are slightly concaved. The outer ends of these sweeps are higher than their inner ends in order to present the land in crown shape after the furrow is formed by the said share, and each side of the furrow formed on an incline to the furrow by the said blades which follow the obtuse angle of the land-plate.

The rearwardly extending and hinged blades referred to are stayed to position by suitable detachable braces 18, the inner ends of which are pivoted to the rear ends of the upper angle-ribs 4, and the outer ends are formed as hooks 15 to enter eyes 13 at proper places on the said rear blades. The land-sweeps 17 are held secure by means of suitable braces 20, connecting said sweeps to their supporting-blades.

24 is the tongue of the machine, to which the horses are hitched and which is connected to the transverse drag-bar 26 at the fore part of the machine. This drag-bar is securely attached to the raised fore ends of the upper-angle-rib work 4 of the machine and to centrally-located auxiliary angle-ribs 28, to which the tongue is secured by means of the said drag-bar and the tongue side straps 30. The fore ends of these auxiliary angle-ribs are curved upward to be on a level with the fore ends of angle-ribs 4, the elevation of the drag-bar above the land-plate 2 being necessary in order to allow the weight of the machine proper to be on the ground when cultivating.

Nearer to the fore part of the land-plate and in horizontal line therewith are two vertical sliding guides 32, the base ends of which are securely fastened to the angle-ribs 4 and have suitable braces connected thereto and to the land-plate for steadying purposes. Each of these slides has a vertical slot or opening in direct line with each other for the admission of the transverse shaft 34, which is provided with a bearing in each said slot and extending beyond the sides of the land-plate in order that the ground-wheels may revolve on or with said shaft 34. This shaft is provided with a sleeve or outer tube 36, which may extend from said shaft bearing to bearing, and to the central part of this tube is securely and rigidly fastened a rearward-operating lever-handle 38, which when brought downward and to the rear of the machine the said tube is revolved and to which are rigidly secured the two lifting-levers 40, the forward ends of which engage with the under part of the drag-bar 26, thus lifting the machine, especially the fore part, from engagement with and entirely free from the ground. The rear part of this lever 38 operates in an opening extending high above the land-plate. The sides 42 of said opening are securely fastened to the rear junction or connection of the two angle-ribs 4 at the rear end of the land-plate. This lever is held in downward position by means of a pin inserted through the sides 42. Said pin prevents the lever from rising. Therefore the rear part of the machine is supported thereby and free from the ground, the whole weight of the machine being on the ground-wheels. At this time the shaft-bearing guides slide upward with the land-plate. This lever 40 is released from this lowered position when the machine is cultivating.

A rudder or guide 10 of approved shape is inserted between the rear ends of the angle-ribs 4 and fastened thereto. This rudder materially assists in keeping the machine in perfect line when at work.

It will be observed how important the blades of the machine are in the function they perform in distributing the earth from the central furrow and extending to the outer parts of the machine. This distribution is very necessary for the purpose intended; also, the land-plate acts upon the earth sufficiently to crush, pulverize, and level to a degree all existing lumps of earth, aiding very materially in the leveling process and the filling in of depressions.

The importance of the rear sweeps in leveling the land and crowning the same in conjunction with the gradual side elevation of the land-plate in thus forming a crowned land from furrow to furrow will be perceptible.

If found desirable at any time after this machine has accomplished its work and when the land is seeded, a similar land-shaper of much smaller build may follow. This follower may be constructed for one-horse capacity and consisting chiefly of the longitudinally-depressed land-plate with its furrow-producing shares and rear guide or tiller.

Various changes in the form, proportion, and minor details of my invention may be resorted to without departing from the spirit and defined scope thereof in the construction herein shown and described. Hence

What I claim as my invention, and desire to secure by Letters Patent, is—

1. A land-draining machine of the character described consisting of a depressed land-plate, blades secured to the under face thereof by means of angle-ribs and extending from the central fore part and beyond said plate and at angles thereto to the rear corners of said plate, and plowshares secured to the fore part of the blades and a rear central rudder secured to the junction of the upper angle-ribs on said plate, as described.

2. A land-draining machine consisting of a depressed land-plate, a plowshare secured to the lower and central fore part thereof, and a rudder secured to the lower and central rear part of the plate and beyond by means of supporting-ribs secured to said plate, and means for drawing the same, substantially as described.

3. A land-draining machine consisting of a depressed land-plate, blades secured to the under face and extending outward toward the rear thereof and secured thereto by means of inner angle-ribs, detachable extension-blades secured to the rear ends of the rigid blades by hinged connection, suitable land-sweep secured and braced to the ends of said extension-blades with detachable braces, their inner ends pivoted to the rear junction of the angle-ribs of the land-plate with rear rudder, a forward-extending plowshare attached to the fore ends of the rigid blades, ground-wheels on ends of tranverse shaft in bearings in vertical slides, a central elongated sleeve on the shaft provided with forward levers to engage with the under part of the forward drag-bar connected to the upper angle-ribs of the plate, a central lever-handle rigidly connected to said sleeve, to raise the land-shaper, and fasten in the rear elevated slot, as described.

4. A land-draining machine consisting of a land-plate formed with gradually-rising sides, blades secured to rigid angle-ribs, underneath said plate, and extending from the central fore part and beyond and widening out to the rear, a plowshare secured to and forming the fore junction of said blades, a rear central rudder, secured to the rear junction of the upper angle-ribs, ground-wheels on ends of transverse shaft, shaft-bearings in vertical slides, a sleeve on said shaft provided with fore levers to engage with the under part of the drag-bar connected to the upper curved angle-ribs of the plate, a central lever-handle on said sleeve to raise the land-shaper on the wheels, and fasten in the rear elevated slot as described.

5. A land-shaping plate having gradually-rising sides, strengthening angle-ribs suitably arranged and secured thereto, under blades extending from the central fore part of the plate and at angles thereto to the extreme rear part and hinged beyond, a plowshare connected to the fore part of the blades, a rudder, or guide, secured to the rearwardly-extending upper ribs, and a transverse shaft having a centrally-located sleeve and supported on side ground-wheels, vertical slides on said plate as guides for the shaft and mechanism for raising the plate up and suspending the same from the shaft, as described.

6. A land-shaping plate of the character described consisting of a plate having gradually-rising sides forming a central depression, a transverse shaft having a sleeve supported by ground-wheels, levers connected to each end of the sleeve to engage with the under part of a forward drag-bar, hand-lever connected to central part of the sleeve to raise the land-plate having vertical slides with direct opening to admit the bearing of said shaft, and means for detaining said hand-lever, as described.

JOHN EDMONDS.

Witnesses:
JOHN H. HENDRY,
B. E. HERALD.